United States Patent
Mikhailov

(10) Patent No.: US 7,368,681 B2
(45) Date of Patent: May 6, 2008

(54) APPARATUS FOR SIMULTANEOUS LASER WELDING

(75) Inventor: Aleksei Mikhailov, Dortmund (DE)

(73) Assignee: Limo Patentverwaltung GmbH & Co. KG, Gerstengrund (DE)

( * ) Notice: Subject to any disclaimer, the term of this patent is extended or adjusted under 35 U.S.C. 154(b) by 0 days.

(21) Appl. No.: 11/491,747

(22) Filed: Jul. 24, 2006

(65) Prior Publication Data
US 2007/0007259 A1    Jan. 11, 2007

Related U.S. Application Data

(63) Continuation of application No. PCT/EP2005/000209, filed on Jan. 12, 2005.

(30) Foreign Application Priority Data
Jan. 24, 2004    (DE) .................. 10 2004 003 696

(51) Int. Cl.
*B23K 26/20* (2006.01)
*B23K 26/067* (2006.01)

(52) U.S. Cl. .................. 219/121.63; 219/121.74; 219/121.76

(58) Field of Classification Search .......... 219/121.63, 219/121.74, 121.76
See application file for complete search history.

(56) References Cited

U.S. PATENT DOCUMENTS

| | | | |
|---|---|---|---|
| 3,981,705 A | 9/1976 | Jaeger et al. | |
| 5,548,610 A | 8/1996 | Bouadma et al. | |
| 5,602,863 A | 2/1997 | Itagaki | |
| 5,886,313 A * | 3/1999 | Krause et al. | 219/121.6 |
| 6,251,328 B1 * | 6/2001 | Beyer et al. | 219/121.76 |
| 6,467,922 B1 * | 10/2002 | Blanc et al. | 362/612 |
| 6,476,345 B1 * | 11/2002 | Sator | 219/121.63 |
| 6,653,592 B2 * | 11/2003 | Andersen | 219/121.67 |
| 2002/0100748 A1 | 8/2002 | Andersen | |
| 2003/0150842 A1* | 8/2003 | Mikame | 219/121.6 |
| 2003/0168437 A1 | 9/2003 | Tanaka | |

FOREIGN PATENT DOCUMENTS

| | | | |
|---|---|---|---|
| DE | 4234342 A1 * | 4/1994 | |
| DE | 44 25 711 A1 | 2/1995 | |
| DE | 100 07 123 A1 | 9/2001 | |
| DE | 100 20 327 A1 | 11/2001 | |
| JP | 62-93094 A * | 4/1987 | |
| JP | 6-262384 | 9/1994 | |
| JP | 2003/260583 | 9/2003 | |

* cited by examiner

*Primary Examiner*—Geoffrey S. Evans
(74) *Attorney, Agent, or Firm*—Laurence A. Greenberg; Werner H. Stemer; Ralph E. Locher

(57) ABSTRACT

A device for the simultaneous welding of work pieces and containing a plurality of laser light sources. The laser light sources are positioned on at least one circle in such a manner that the partial beams emitted by the laser light sources produce at least one region that lies radially further inwards. The region, in some areas, has a substantially constant luminosity and the work pieces are introduced into the region.

9 Claims, 2 Drawing Sheets

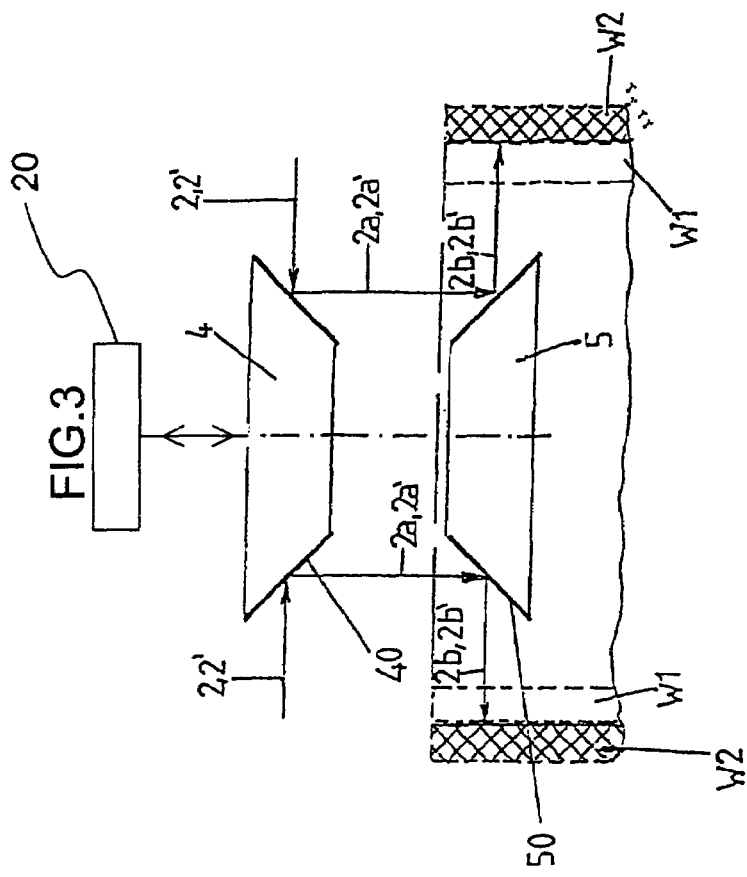
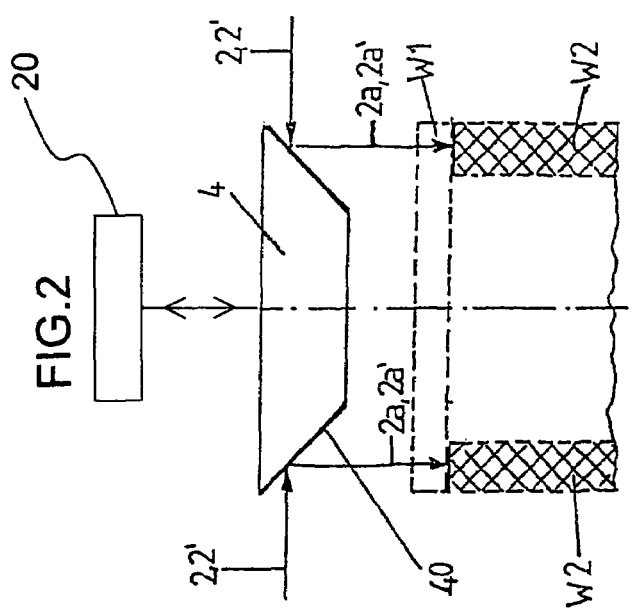

APPARATUS FOR SIMULTANEOUS LASER WELDING

CROSS-REFERENCE TO RELATED APPLICATIONS

This is a continuing application, under 35 U.S.C. §120, of copending international application No. PCT/EP2005/000209, filed Jan. 12, 2005, which designated the United States; this application also claims the priority, under 35 U.S.C. §119, of German patent application No. DE 10 2004 003 696.9, filed Jan. 24, 2004; the prior applications are herewith incorporated by reference in their entirety.

BACKGROUND OF THE INVENTION

Field of the Invention

The present invention relates to an apparatus for simultaneous welding of work pieces by laser beams, having a plurality of laser light sources.

Laser welding in general, and so-called transmission welding in particular, have been found in previous years to be alternatives to other joint connections known from the prior art, such as screwing or adhesive bonding.

In the case of transmission welding, laser light is passed through a work piece which is transparent for laser light and is absorbed on a surface of a second work piece, so that the surface of the second work piece is locally melted. Owing to the flat contact between the two work pieces, which are pressed against one another during the welding process, the work piece which is transparent for laser light is also locally melted, so that a laser weld bead is formed in the area of a boundary surface between the two work pieces, after they have cooled down.

In addition to so-called contour welding, in which a laser light source is moved along the desired contour of the weld bead, it is also already known for two work pieces to be welded to one another simultaneously. For this purpose, in an apparatus of the type mentioned initially, laser diodes are placed above the work pieces, so that the entire weld bead can be produced simultaneously. The construction of an apparatus such as this for simultaneous transmission welding of work pieces by laser light is, however, quite complex and is also costly depending on the number of laser light sources required. Furthermore, curved weld bead profiles can be produced only to a restricted extent. In addition, in the case of the apparatuses which are known from the prior art, new diode holders are always required for a change in the weld bead contour, and must always be matched to the profile of the configured weld bead contour.

SUMMARY OF INVENTION

It is accordingly an object of the invention to provide an apparatus for simultaneous laser welding which overcomes the above-mentioned disadvantages of the prior art devices of this general type, which produces largely any desired weld beads, in particular also including curved weld beads, and can be produced in a simple manner.

The invention proposes that the laser light sources are disposed in at least one circle in such a way that beam elements which are emitted from the laser light sources produce an area which is located radially further inwards, with an energy density which is substantially constant in places, and into which the work pieces can be introduced. The work pieces to be welded to one another can then be introduced into this area which is located radially further inwards, that is to say within the at least one circle, and can be welded to one another along a weld bead which can largely be chosen as required. During the welding process, a work piece which is transparent for laser light faces at least some of the laser light sources. The area with an substantially constant energy density in places results from superimposition of the intensities of the beam elements emitted from the laser light sources. The homogeneity of the area of constant energy density is governed in particular by the number of laser light sources used. If a sufficient number of laser light sources are used, the area of constant energy density may, for example, be virtually circular.

For symmetry reasons, the laser light sources are preferably disposed substantially at equal distances from one another on the circumference of the at least one circle. In practice, this makes it easier to estimate the order of the magnitude of the energy density and the area in which the energy density is substantially constant more easily, and to calculate it in advance.

In one preferred embodiment, the laser light sources are in the form of semiconductor laser elements. The semiconductor laser elements can preferably have at least one laser diode bar. The laser diode bars emit light at a wavelength in the order of magnitude between about 800 and 1000 nm, which is suitable for welding of work pieces, in particular composed of plastic.

In one particularly preferred embodiment, each laser light source has associated lens, in which case at least one of the lens can provide fast axis collimation of the beam elements. Replacement of the lens, in particular of those lens in the slow axis direction, makes it possible to laterally increase or reduce the size of the at least one area with an energy density which is substantially constant in places.

In order to allow the apparatus according to the invention to be used not only for welding of work pieces in the radial emission direction of the laser light sources, but furthermore, also to allow it to be used for the welding of two work pieces in the axial direction, one development of the invention provides that the apparatus has at least one first mirror element which is disposed located radially further inwards than the at least one circle on which the laser light sources are disposed and which can reflect at least some of the beam elements in an axial direction. This makes it possible, for example, to weld a housing cover which is transparent for laser light to a housing whose material absorbs laser light. Furthermore, this development of the invention can also be used for so-called butt welding. In the case of butt welding, the joint partners absorb the laser light equally and are deliberately heated, locally melted and welded to one another along the desired weld bead profile.

In one preferred embodiment, the apparatus has a device for varying an axial distance between the first mirror element and at least one of the work pieces. The working distance, that is to say the distance between the first mirror element and the work piece, can thus be varied so that the width of the weld bead can deliberately be varied depending on the working distance.

In order to allow a closed weld bead profile, in particular, an approximately circular weld bead profile, to be achieved, one particularly preferred embodiment provides that the first mirror element is in the form of a conical mirror element, at least in places. For symmetry reasons, the use of a conical mirror element such as this results in an substantially circular weld bead. If the conical mirror element is appropriately shaped, the weld bead may also be elliptical. In principle, however, a large number of different mirror elements may be used, which just need to be matched to the respectively desired profile of the weld bead.

In order to also make it possible to use the apparatus according to the invention for welding work pieces to one another in which the work piece which is transparent for laser light is disposed located radially further inwards and the work piece which absorbs laser light is located radially further outwards, one particularly advantageous embodiment provides that the apparatus has at least one second mirror element which is at a distance from the first mirror element in the axial direction and reflects those beam elements which have been reflected by the first mirror element at least partially radially outwards.

The second mirror element is preferably in the form of a conical mirror element, at least in places. This likewise makes it possible to produce circular or elliptical weld beads.

In order to allow the energy density and the illumination of the at least one area with a substantially constant energy density to be adapted and varied deliberately, one particularly advantageous embodiment provides that each laser light source can be operated independently of the other laser light sources.

The present invention provides an apparatus for simultaneous welding of work pieces by laser beams, which apparatus inter alia also allows the simultaneous welding of weld bead contours which are in the form of a circular arc at least in places, in which case it is irrelevant whether the material which is transparent for laser light is disposed located radially further inwards or radially further outwards.

Other features which are considered as characteristic for the invention are set forth in the appended claims.

Although the invention is illustrated and described herein as embodied in an apparatus for simultaneous laser welding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic, simplified side view of a second embodiment of the apparatus according to the invention; and FIG. 3 is a diagrammatic, simplified side view of a third embodiment of the apparatus according to the invention.

DESCRIPTION OF THE PREFERRED EMBODIMENTS

Figure 1:
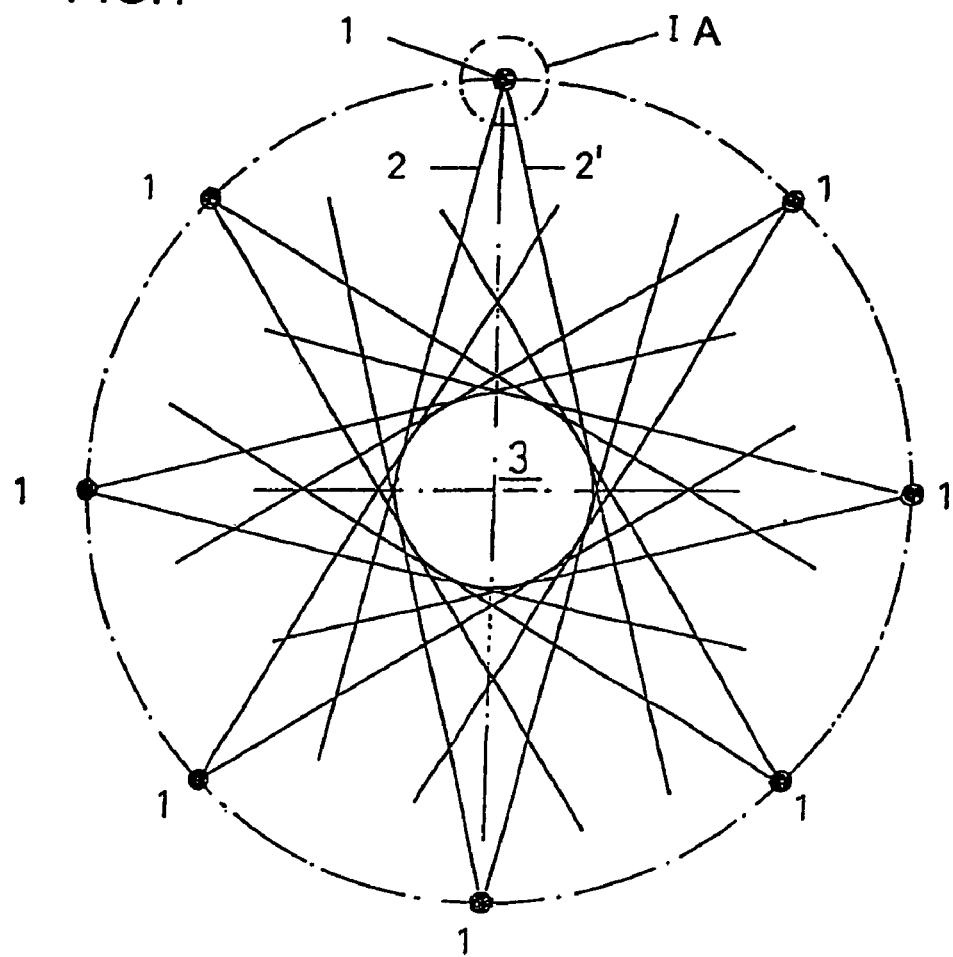
FIG. 1 is a diagrammatic, simplified plan view of a first embodiment of an apparatus for simultaneous welding of a work piece by laser beams according to the invention.

Referring now to the figures of the drawing in detail and first, particularly, to FIG. 1 thereof, there is shown a schematically simplified plan view of an apparatus according to the invention for simultaneous welding of work pieces by laser beams. The apparatus has a plurality of laser light sources 1, which are disposed in a circular formation and emit laser light radially inwards. All of the laser light sources 1 are each at identical distances from a center point of the circle. If required, additional laser light sources can be disposed on further concentric circles around a common center point, whose radii may differ from that of the circle illustrated in FIG. 1. As can be seen, in this exemplary embodiment, the laser light sources 1 are disposed at equal distances from one another on the circumference of the circle, for symmetry reasons. For simplicity, the illustration in FIG. 1 shows only eight laser light sources 1. The laser light sources 1 can preferably be operated independently of one another in order to allow work pieces to be specifically illuminated with laser light.

Figure 1A:
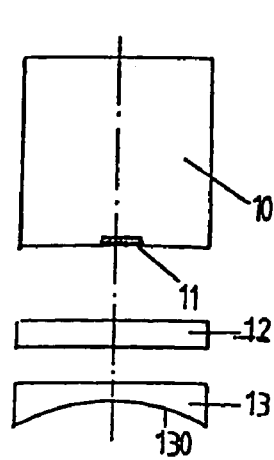
FIG. 1A is an enlarged plan view of detail IA shown in FIG. 1.

FIG. 1A shows a plan view of the configuration of the laser light sources 1. The laser light source 1 may be in the form of a semiconductor laser element and, in particular, in the form of laser diode bars 10 with a light outlet area 11. In addition to the laser diode bars 10, each of the laser light sources 1 in this exemplary embodiment has two lens 12, 13. A first lens 12 is in this case used for fast axis collimation. The second lens 13 has a concave optically functional boundary surface. In conjunction with FIG. 1, it can also be seen that beam elements 2, 2' which are emitted from laser light sources 1 each propagate at the same angles but in opposite directions to the normal to the light outlet area 11 of the laser diode bars 10.

FIG. 1 illustrates two beam elements 2, 2' in each case for each laser light source 1. As can be seen, the beam elements 2, 2' intersect in an. area 3 of the circle which is located radially further inwards and on which the laser light sources 1 are disposed in the apparatus according to the invention so that the intensities of the beam elements 2, 2' are superimposed in the area 3. This results in the formation of the area 3, in which the energy density of the laser light is substantially constant, in the interior of the apparatus. If the number of laser light sources 1 is relatively small, this area 3 is polygonal. If the number of laser light sources used is increased, this area 3 of constant energy density can also be virtually circular. In practice, by way of example, 30 laser light sources may be used in order to produce the area 3 of constant energy density. In this case, the area 3 of constant energy density can be laterally increased or reduced in size by replacement of the lens 12, 13 in particular of the lens 13 with a concave shape in places, in the slow axis direction.

During operation of the apparatus according to the invention, the work pieces to be welded to one another can be introduced into the area 3, in which case the profile of the laser weld bead can in principle be as required, and depends on the shape of the work pieces, in particular on the profile of the boundary surfaces between the work pieces. The working distance between the laser light sources 1 and the area 3 into which the work pieces to be welded to one another can be introduced in this case depends in particular on the number of laser light sources 1, and on the optical characteristics of the lens 12, 13. Since only one diffraction-limited fast axis divergence occurs behind the lens 12, the configution according to the invention can be used to produce weld beads which may have a width in the order of magnitude of about 2 mm.

Figure 1B:
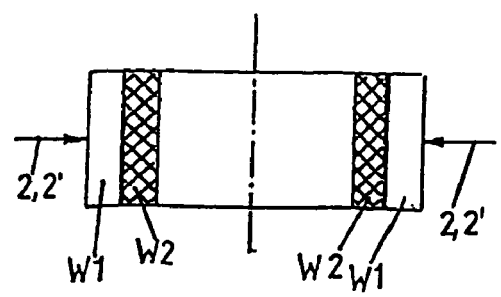
FIG. 1B is diagrammatic, side view of the laser welding process according to the first embodiment of the invention.

FIG. 1B illustrates a schematic side view of the welding process using the apparatus illustrated in FIG. 1. During transmission welding, the beam elements 2, 2' first of all pass through a work piece W1 which is transparent for laser light and normally has a transmission level of more than 60%.

The beam elements 2, 2' then strike a second work piece W2, which itself absorbs the beam elements 2, 2' close to the surface. The absorption leads to local melting of the work piece W2 at the boundary surface between the work pieces W1, W2. During this process, the two work pieces W1, W2 are pressed against one another with a specific contact force, so that they are welded to one another along a common weld bead. By way of example, all thermoplastics as well as all plastics in the form of thermoplastic elastomers are suitable as work pieces which can be welded to one another by the apparatus according to the invention.

It is frequently necessary, for example to weld a cover composed of a material which is transparent to laser light to a housing part which absorbs the laser light at least in places. This cannot be done without problem by the first embodiment of the apparatus illustrated in FIG. 1.

FIG. 2 shows, schematically, a side view of a second embodiment of the present invention which, for example allows a transparent cover to be welded to a housing part which absorbs laser light. For this purpose, a first mirror element 4, which in this exemplary embodiment is in the form of a conically shaped mirror element, is introduced into the beam path of the apparatus according to the invention as shown in FIG. 1 in such a manner that the beam elements 2, 2' are reflected by reflecting surfaces 40 of the first mirror element 4 at least partially as beam elements 2a, 2a' in the axial direction of a transparent work piece W1, for example, a housing cover. The beam elements 2a, 2a' pass through the transparent work piece W1 and are absorbed on surfaces of the work piece W2. As already explained above, a laser weld bead is once again produced at the boundary surfaces between the work pieces W1, W2.

The width of the weld bead can be varied by a variation of the distance in axial direction between the first mirror element 4 and the work piece W1. The apparatus has a device 20 for varying the axial distance between the first mirror element 4 and at least one of the work pieces W1, W2. The working distance, that is to say the distance between the first mirror element and the work piece, can thus be varied so that the width of the weld bead can deliberately be varied depending on the working distance. Furthermore the contour of the weld bead can also be varied by using a conical mirror element whose reflective surfaces have a different inclination to that illustrated in FIG. 2. The work pieces W1, W2 can be simultaneously welded to one another along a substantially circular weld bead by using the conical mirror element 4 as illustrated in FIG. 2. The shape of the weld bead can be varied specifically by using a mirror element of any desired shape instead of a conical mirror element. The apparatus shown in FIG. 2 can be used not only for transmission welding but also for butt welding of work pieces such as these which absorb laser light.

The use of the apparatus according to the invention as shown in FIGS. 1 and 1B is dependent on the material of the work piece W1 which is located radially further outwards being transparent for the laser light that is used, and on the material W2 which is located radially further inwards absorbing the laser light at the corresponding wavelength. However, it is frequently desirable to be able to weld two different work pieces to one another, with the work piece which is located radially further outwards absorbing the laser light while, in contrast the work piece which is located radially further inwards is transparent for the laser light. The simultaneous laser welding of a configuration such as this is not possible by the arrangements illustrated in FIGS. 1 and 2.

FIG. 3 shows a third embodiment of the present invention which allows simultaneous welding of work pieces W1, W2, with the work pieces W1 which are located radially further inwards transmitting the laser light and the work pieces W2 which are located radially further outwards absorbing the laser light. In order also to make it possible to weld the work pieces W1, W2 with the aid of the apparatus described here in a configuration such as this, the arrangement as shown in FIG. 2 is extended according to the third embodiment of the present invention by disposing a second mirror element 5 underneath the first mirror element 4 in the axial direction. In this exemplary embodiment, the second mirror element 5 is also in the form of a conical mirror element, like the first mirror element 4. The beam elements 2, 2' which are emitted from the laser light sources 1, first strike the reflection surfaces 40 from the first mirror element 4, and are at least partially reflected as beam elements 2a, 2a' from the first mirror element 4 in the axial direction. The reflected beam elements 2a, 2a' then strike reflection surfaces 50 on the second mirror element 5, and are reflected at least partially radially outwards from them (beam elements 2b, 2b'). The beam elements 2b, 2b' in turn pass through the transparent work pieces W1 and are then absorbed by the work piece W2 which absorbs laser light. Once again, the desired weld bead is produced at the boundary surface between the work pieces W1, W2. Like the first mirror element 4, the second mirror element 5 also does not necessarily need to have a conical shape. The shape of the second mirror element 5 once again depends on the weld bead contour to be welded.

I claim:

1. An apparatus for simultaneous welding of work pieces, the apparatus comprising:
    a plurality of laser light sources outputting laser beams having beam elements, said laser light sources disposed in a formation defining at least one circle and said beam elements emitting from said laser light sources producing an area disposed radially further inwards having an energy density being substantially constant in places, and into said area the work pieces being introduced;
    at least one first mirror element disposed radially further inwards than said at least one circle on which said laser light sources are disposed, said at least one first mirror element reflecting at least some of the beam elements in an axial direction; and
    a device for varying an axial distance between said first mirror element and at least one of the work pieces.

2. The apparatus according to claim 1, wherein said laser light sources are disposed substantially at equal distances from one another on a circumference of said at least one circle.

3. The apparatus according to claim 1, wherein said laser light sources are semiconductor laser elements.

4. The apparatus according to claim 3, wherein said semiconductor laser elements have at least one laser diode bar.

5. The apparatus according to claim 1, wherein each of said laser light sources has lens, at least one of said lens providing fast axis collimation of said beam elements.

6. The apparatus according to claim 1, further comprising at least one second mirror element disposed at a distance from said first mirror element in the axial direction and reflects said beam elements which have been reflected by said first mirror element at least partially radially outwards.

7. The apparatus according to claim 6, wherein said second mirror element is a conical mirror element, at least in places.

8. The apparatus according to claim 1, wherein said first mirror element is a conical mirror element, at least in places.

9. The apparatus according to claim 1, wherein each of said laser light sources can be operated independently of other ones of said laser light sources.

* * * * *